United States Patent
Kodato et al.

(10) Patent No.: US 9,869,327 B2
(45) Date of Patent: Jan. 16, 2018

(54) PORTABLE BLOWER

(71) Applicant: HITACHI KOKI CO., LTD., Tokyo (JP)

(72) Inventors: Seiichi Kodato, Ibaraki (JP); Mizuho Nakamura, Ibaraki (JP); Tomomasa Nishikawa, Ibaraki (JP); Kouji Sagawa, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 654 days.

(21) Appl. No.: 13/967,622

(22) Filed: Aug. 15, 2013

(65) Prior Publication Data
US 2014/0050600 A1 Feb. 20, 2014

(30) Foreign Application Priority Data

Aug. 20, 2012 (JP) .................. 2012-181397

(51) Int. Cl.
*F04D 29/52* (2006.01)
*F04D 25/06* (2006.01)
(Continued)

(52) U.S. Cl.
CPC .......... *F04D 29/522* (2013.01); *A01G 1/125* (2013.01); *A47L 5/14* (2013.01); *F04D 25/068* (2013.01);
(Continued)

(58) Field of Classification Search
CPC .... F04D 29/522; F04D 29/541; F04D 29/646; F04D 25/068; F04D 25/0673;
(Continued)

(56) References Cited

U.S. PATENT DOCUMENTS

| 4,132,507 A | 1/1979 | Akiyama et al. |
| 4,884,314 A * | 12/1989 | Miner .................. A47L 5/14 |
| | | 15/344 |

(Continued)

FOREIGN PATENT DOCUMENTS

| JP | 3-501814 A | 4/1991 |
| JP | 2014-511953 A | 5/2014 |

(Continued)

OTHER PUBLICATIONS

Japanese Office Action for the related Japanese Patent Application No. 2012-181937 dated Nov. 25, 2015.

(Continued)

*Primary Examiner* — Essama Omgba
*Assistant Examiner* — Stephen Mick
(74) *Attorney, Agent, or Firm* — Kenealy Vaidya LLP

(57) ABSTRACT

A brushless motor is incorporated in one of divided constituent members of a motor casing which is disassembled, and then, the divided constituent members of the motor casing which is disassembled are connected to each other into the motor casing assembled with mgachine screws screwed into machine screw holes. As this occurs, when a wiring of the brushless motor is held by a first stationary blade portion and a second stationary blade portion, the wiring is allowed to lead to an outside of an outer cylindrical portion through a gap defined between the first stationary blade portion and the second stationary blade portion.

5 Claims, 9 Drawing Sheets

(51) Int. Cl.
  *F04D 29/64* (2006.01)
  *A47L 5/14* (2006.01)
  *F04D 29/54* (2006.01)
  *A01G 1/12* (2006.01)

(52) U.S. Cl.
  CPC ....... *F04D 25/0673* (2013.01); *F04D 29/541* (2013.01); *F04D 29/646* (2013.01)

(58) Field of Classification Search
  CPC . A01G 1/125; A47L 5/14; H02K 5/00; H02K 5/04; H02K 5/18; H02K 5/20
  USPC .... 417/410.1, 423.7, 423.14; 310/50, 88, 89
  See application file for complete search history.

(56) References Cited

U.S. PATENT DOCUMENTS

| | | | |
|---|---|---|---|
| 6,105,206 A | 8/2000 | Tokumaru et al. | |
| 6,328,547 B1* | 12/2001 | Morita | F04C 13/005 418/107 |
| 7,358,631 B2* | 4/2008 | Morishitahara | F04D 25/0613 310/71 |
| 2005/0123393 A1* | 6/2005 | Saitou | A47L 5/14 415/119 |
| 2006/0043818 A1* | 3/2006 | Chen | H02K 5/00 310/239 |
| 2012/0076672 A1 | 3/2012 | Binder | |
| 2012/0201668 A1* | 8/2012 | Peterson | F04D 25/084 415/208.2 |
| 2014/0140861 A1* | 5/2014 | Pellenc | A01G 1/125 417/44.1 |

FOREIGN PATENT DOCUMENTS

WO   89/04135 A1   5/1989
WO   WO2012/136906   * 10/2012

OTHER PUBLICATIONS

Written Opinion and Preliminary Search Report of the related French Application No. 1358067 dated Apr. 23, 2015.

* cited by examiner

PORTABLE BLOWER

CROSS-REFERENCE TO RELATED APPLICATIONS

This application claims priority from Japanese Patent Application No. 2012-181937 filed on Aug. 20, 2012, the entire subject-matter of which is incorporated herein by reference.

TECHNICAL FIELD

The present invention relates to a portable blower which is configured to blow off dust or the like for cleaning.

BACKGROUND

In a cordless portable blower, a motor built in the main body thereof is driven using the power of a battery (e.g., a battery pack) to rotate a fan to thereby generate an air current, and the air current is injected through a nozzle for cleaning (see, for example, JP-T-3-501814). An operator carries out a cleaning operation while gripping the handle portion of the blower. Generally, in order to blow off dust or the like on the ground, while holding the blower main body with the nozzle directed obliquely downward and forward, the operator swings the main body right and left to thereby blow off the dust or the like. Here, a centrifugal fan or an axial flow fan is used in the blower.

SUMMARY

In a related-art blower using an axial flow fan, there is provided a casing for a motor (a motor casing) separately from a molded member on which stationary blades are formed, which increases the number of constituent components involved, eventually leading to an increase in cost. Even when attempting to incorporate the motor inside the molded member on which the stationary blades are formed to cope with the problem above, the incorporation of the motor in the interior of the integrally molded member involves a complicated assemblage and hence has been difficult to be implemented.

In addition, in blowers, to meet an increasing demand for smaller blowers, it is demanded to reduce a total axial length of a motor and a fan.

Further, in blowers, in the event that through holes for assembling motor casing members together remain open while facing an air flow path, there is caused a problem that the assembling through holes affect an air flow passing through the air flow path.

Therefore, one illustrative aspect of the invention provides a blower including a motor casing having a stationary blade portion formed integrally thereon and holding a motor thereinside.

Another illustrative aspect of the invention provides a blower which can reduce a total axial length of a motor and a fan.

Still another illustrative aspect of the invention provides a blower which can reduce the degree of influence of through holes for assembling motor casing members together on an air flow passing through an air flow path.

According to a first aspect of the invention, there is provided a portable blower comprising: a motor; and a motor casing configured to support the motor, wherein the motor casing comprises: an outer cylindrical portion; an inner cylindrical portion, wherein the motor is positioned in an inside of the inner cylindrical portion; and stationary blade portions which are provided so as to bridge between the outer cylindrical portion and the inner cylindrical portion, and wherein the motor casing is made up by integrally combining a first divided constituent member and a second divided constituent member.

According to a second aspect of the invention, there is provided a portable blower comprising: a motor; a fan configured to be rotated by the motor; and a motor casing configured to support the motor, wherein the motor casing comprises a bearing hold portion configured to hold a bearing that is configured to support a rear end portion of an output shaft of the motor, and wherein the fan comprises: a dome portion which covers the bearing holding portion; and moving blade portions which are provided on the dome portion, and wherein the moving blade portions and the bearing overlap in an axial direction.

According to a third aspect of the invention, there is provided a portable blower comprising: a main body housing; a motor casing which is fixed to the main body housing; and a motor which is supported on the motor casing, wherein the motor casing comprises: an outer cylindrical portion; and an inner cylindrical portion, wherein the motor is positioned in an inside of the inner cylindrical portion, and wherein the motor casing is made up of divided constituent members, wherein an assembling through hole is provided in the outer cylindrical portion, and wherein a projecting portion for filling the assembling through hole is provided on an inner surface of the main body housing.

Incidentally, arbitrary combinations of the above-described constituent elements and changes in representation of the invention with respect to method and system are also effective as embodiments of the invention.

According to the first aspect of the invention, it is possible to realize the portable blower including the motor casing which has the stationary blade portions provided integrally thereon and holding the motor thereinside.

According to the second aspect of the invention, it is possible to provide the blower which can reduce the total axial length of the motor and the fan.

According to the third aspect of the invention, it is possible to realize the blower which can reduce the influence of the assembling through hole in the motor casing on the air flow passing through the air flow path.

DETAILED DESCRIPTION

Hereinafter, exemplary embodiments of the invention will be described with reference to the accompanying drawings. Here, the same or equivalent composing elements, members and the like shown in the respective drawings are given the same designations and the duplicated description thereof is omitted properly. Also, the exemplary embodiment does not limit the invention but illustrates an example of the invention, and thus characteristics and their combinations described in the exemplary embodiment are not always the essential matter of the invention.

Figure 1:
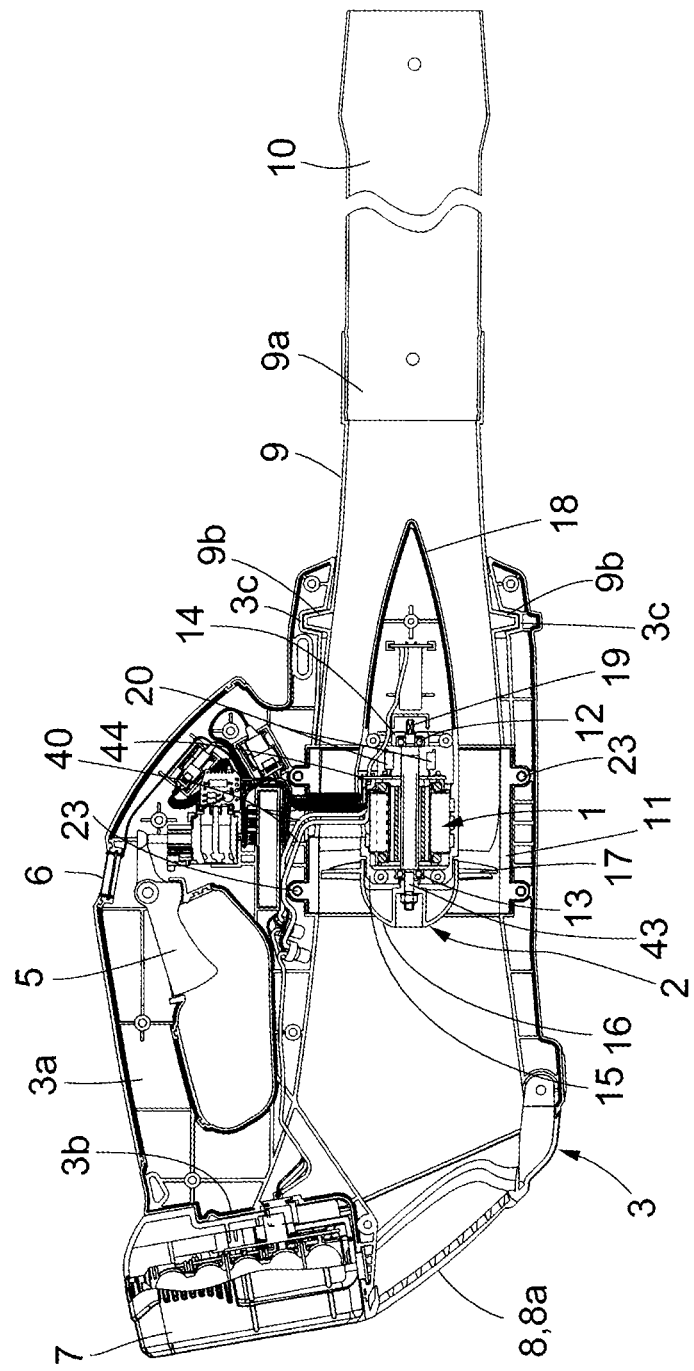
FIG. 1 is a side section view of a cordless portable blower according to an exemplary embodiment of the invention.
Figure 2:
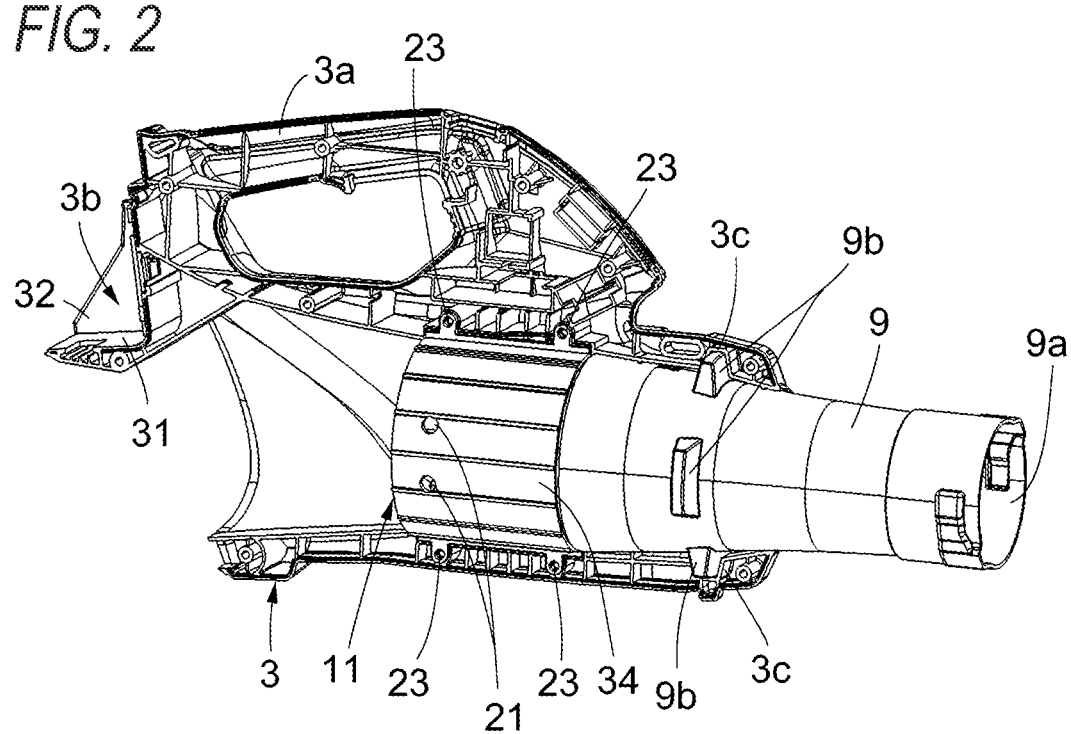
FIG. 2 is a perspective view of the cordless portable blower, with one of the portions of a bisected main body housing removed therefrom.
Figure 3:
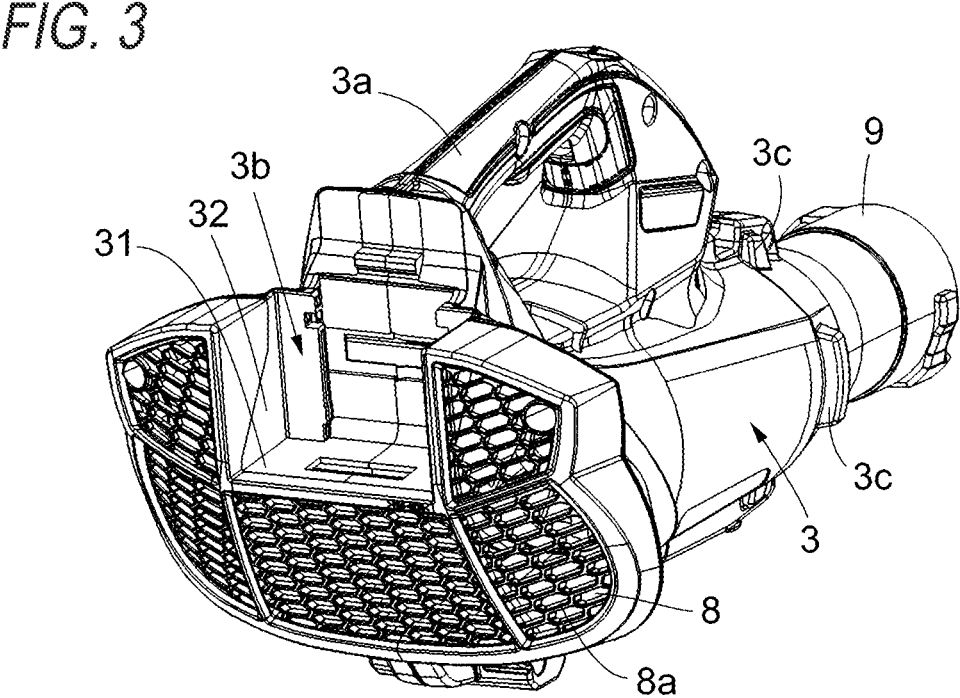
FIG. 3 is a rearward perspective view of the cordless portable blower.
Figure 4:
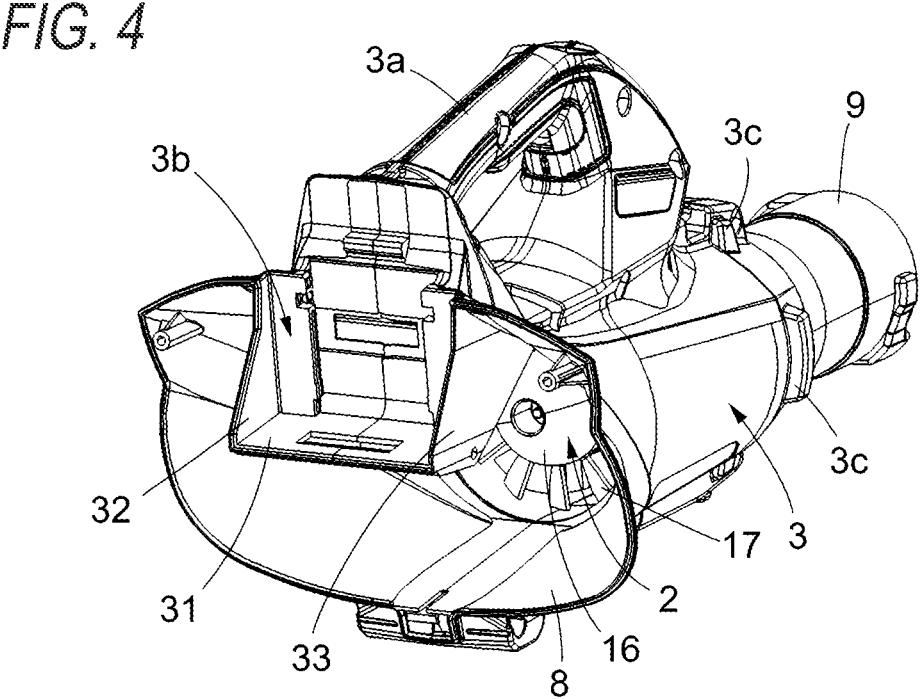
FIG. 4 is a rearward perspective view of the cordless portable blower, with a cover removed therefrom.
Figure 5:
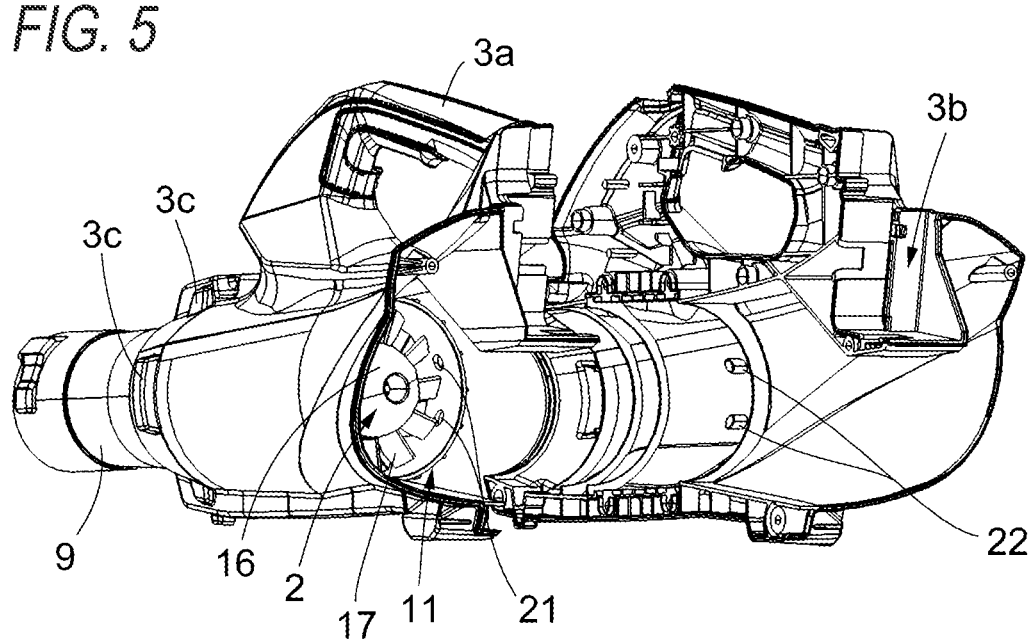
FIG. 5 is a rearward perspective view of the cordless portable blower, with the main body housing disassembled.
Figure 6:
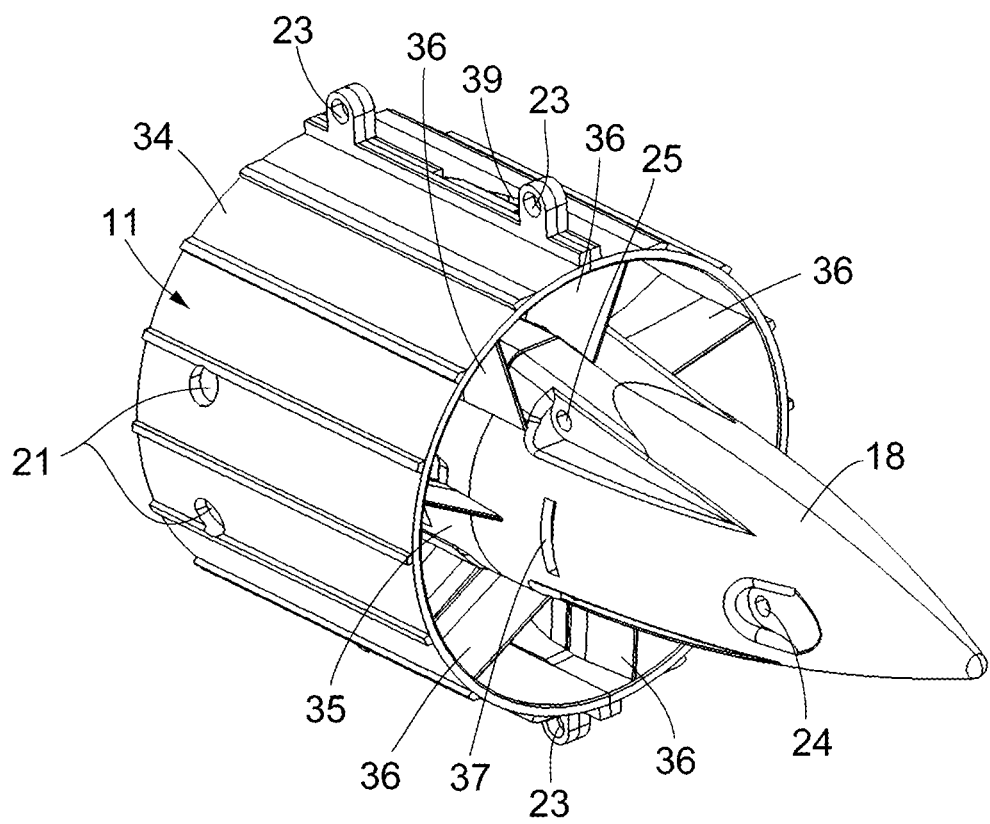
FIG. 6 is a first forward perspective view of a motor casing of the cordless portable blower.
Figure 7:
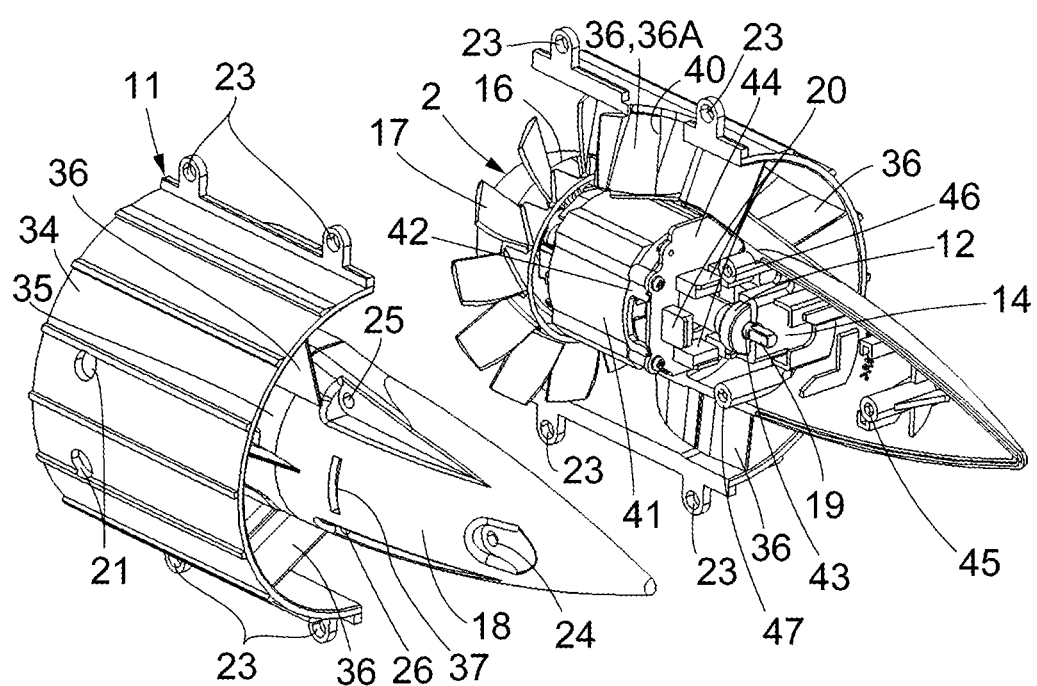
FIG. 7 is perspective views of the motor casing and its internal structure, with the motor casing disassembled.
Figure 8:
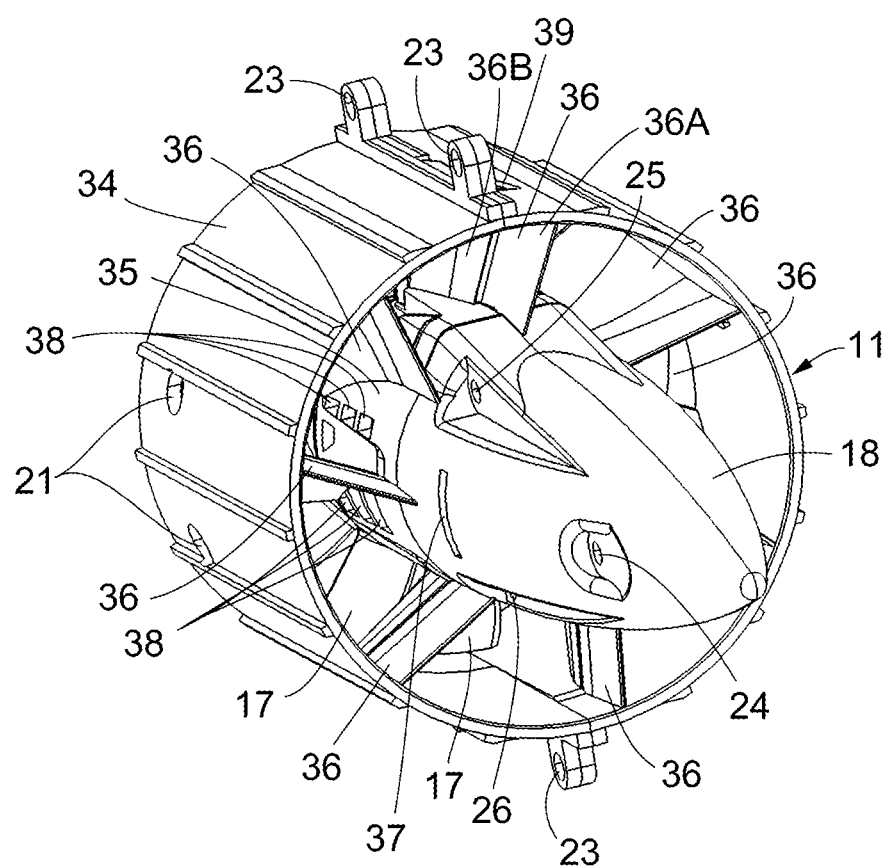
FIG. 8 is a second forward perspective view of the motor casing.
Figure 9:
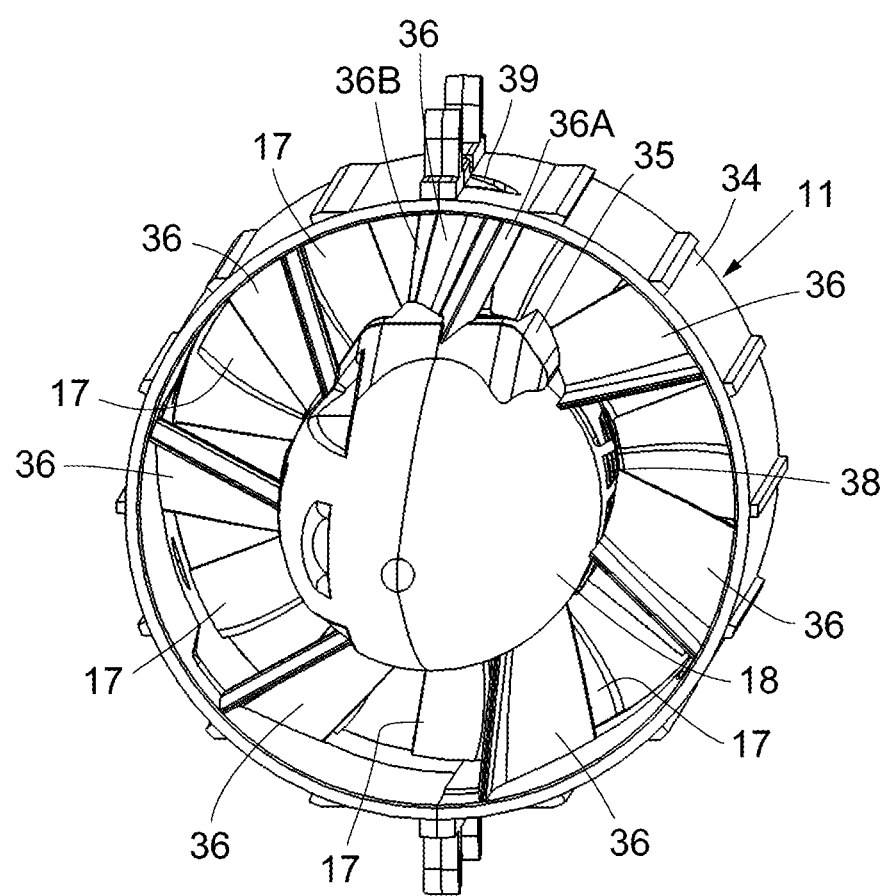
FIG. 9 is a third forward perspective view of the motor casing.
Figure 10:
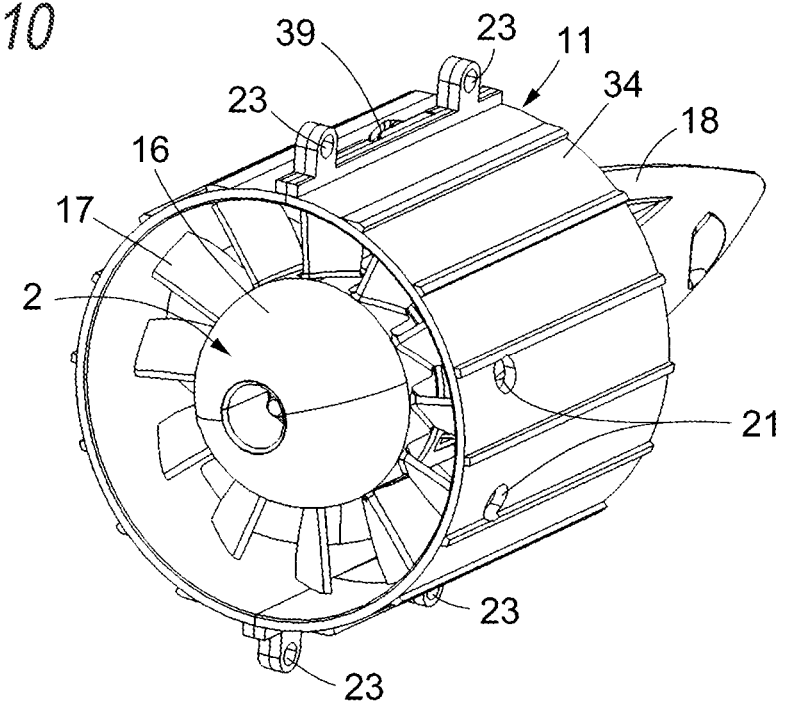
FIG. 10 is a rearward perspective view of the motor casing and its internal structure.
Figure 11:
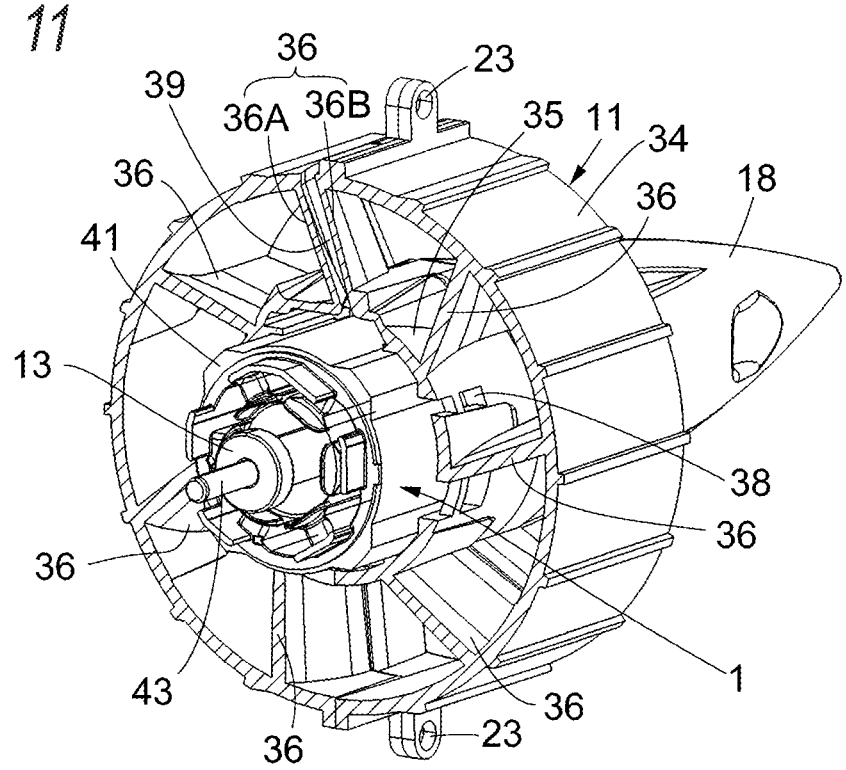
FIG. 11 is a rearward perspective view of the motor casing and its internal structure, when a fan is removed and the motor casing is cut in its longitudinal middle position to thereby provide a section thereof.
Figure 12:
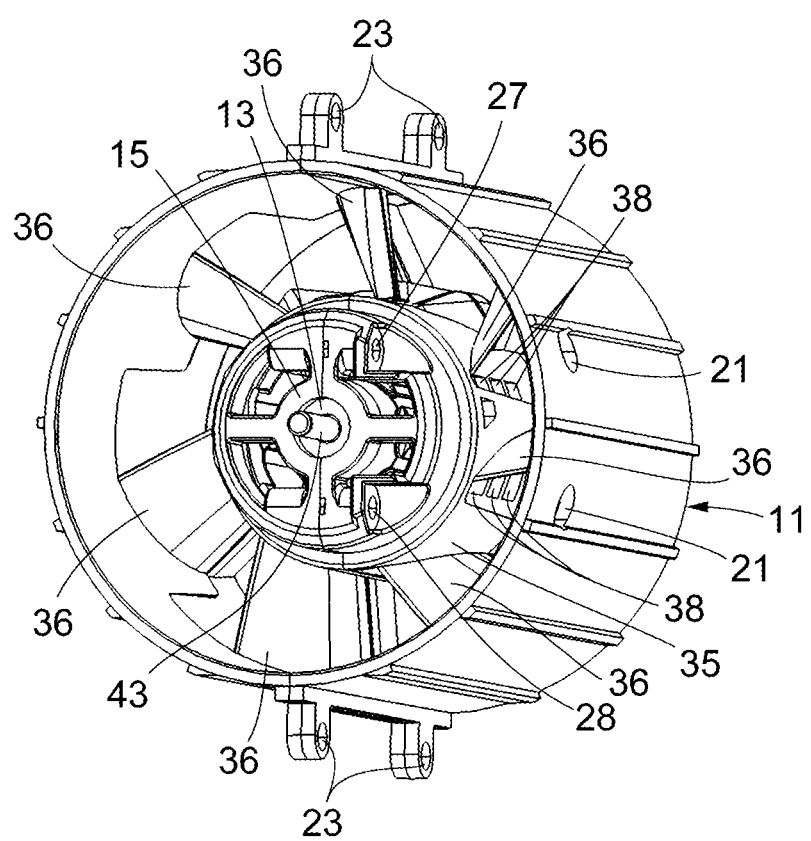
FIG. 12 is a rearward perspective view of the motor casing and its internal structure, with the fan removed.

FIG. 1 is a side section view of a cordless portable blower according to the exemplary embodiment of the invention. FIG. 2 is a perspective view of the cordless portable blower, with one of the portions of a bisected main body housing 3 removed therefrom. FIG. 3 is a rearward perspective view of the cordless portable blower. FIG. 4 is a rearward perspective view of the cordless portable blower, with a cover 8a removed therefrom. FIG. 5 is a rearward perspective view of the cordless portable blower, with the main body housing 3 disassembled. FIG. 6 is a first forward perspective view of a motor casing 11 of the cordless portable blower. FIG. 7 is perspective views of the motor casing 11 and its internal structure, with the motor casing 11 disassembled. FIG. 8 is a second forward perspective view of the motor casing 11. FIG. 9 is a third forward perspective view of the motor casing 11. FIG. 10 is a rearward perspective view of the motor casing 11 and its internal structure. FIG. 11 is a rearward perspective view of the motor casing 11 and its internal structure, when a fan 2 is removed and the motor casing 11 is cut in its longitudinal middle position to thereby provide a section thereof. FIG. 12 is a rearward perspective view of the motor casing 11 and its internal structure, with the fan 2 removed therefrom.

As shown in FIG. 1, the cordless portable blower includes, for example, a brushless motor 1 and a fan 2 within the main body housing 3 made of resin, for example. A trigger switch 5 (speed control trigger switch) is provided on the forefinger side of the handle portion 3a (grip portion) of the main body housing 3, while a tactile switch 6 (operation button) is provided on the thumb side thereof. The main body housing 3 includes a battery mounting portion 3b behind the handle portion 3a. A battery pack 7 serving as a battery is removably mounted on the battery mounting portion 3b. The main body housing 3 has an air inlet 8 in its rear end (in FIG. 1, left end), while a cylindrical air guide passage member 9 made of resin, for example, is mounted on its front end (in FIG. 1, right end). A cover 8a having a large number of mesh-pattern openings is removably mounted on and fixed to the air inlet 8. A nozzle 10 is mounted on an air outlet 9a formed in the front end of the air guide passage member 9. When an operator pulls the trigger switch 5, power is supplied from the battery pack 7 to the brushless motor 1 to rotate the brushless motor 1. Thus, for example, the fan 2 rotatable integrally with the brushless motor 1 generates an air current, whereby air sucked from the air inlet 8 is blown out from the air outlet 9a to the outside through the nozzle 10e. The driving control of the brushless motor 1 is well known and thus the description thereof is omitted here.

As can be seen from FIGS. 3 and 4, the battery mounting portion 3b projects convexly into an air passage (projects convexly into the air inlet 8). A bottom surface section 31 and side surface sections 32, 33 of the battery mounting portion 3b configure part of the inner surface of the air passage. Also, the battery mounting portion 3b holds the battery pack 7 in such manner that the center of gravity of the battery pack 7 exists at an attitude as close to the handle portion 3a as possible. Specifically, the battery mounting portion 3b holds the battery pack 7 such that the greatest surface of the battery pack 7 having a substantially cuboid shape faces the handle portion 3a. Also, the battery mounting portion 3b holds the battery pack 7 such that the longitudinal direction of the battery pack 7 faces the air passage.

The fan 2 includes a dome portion 16 and a moving blade 17. The dome portion 16 is configured to not only prevent dust or the like from entering the brushless motor 1 but also arrange the air current. The moving blade 17 is provided on and projected outwardly from the base-end side outer peripheral surface of the dome portion 16. The moving blade 17 includes a predetermined number of (e.g., twelve) moving blades at regular angular intervals around the shaft of the fan 2. The fan 2 is fixed to the rear end portion of the output shaft 43 of the brushless motor 1 by, for example, a nut and can be rotated integrally with the output shaft 43. The dome portion 16 covers a rear bearing hold portion 15, while the moving blade 17 overlaps with a rear bearing 13 in the axial portion thereof. This can reduce the total of the axial-direction lengths of the brushless motor 1 and fan 2.

As shown in FIG. 2, the main body housing 3 is bisected right and left. A motor casing 11, for example, made of resin is mounted on and fixed to the inside of the main body housing 3 using screwing holes 23 (by screwing). The motor casing 11 is also bisected right and left (refer to FIG. 7 as well), while the right and left portions of the bisected motor casing 11 are connected into an integral body by screwing the screwing holes 23. Here, the screws for fixing the motor casing 11 are used in common with some of the screws for connecting together the right and left portions of the main body housing 3. As shown in FIGS. 6 to 12, the motor casing 11 includes an outer cylindrical portion 34, an inner cylindrical portion 35, a stationary blade 36, an air current arranging cone 18, a front bearing hold portion 14 (refer to FIG. 7) and a rear bearing hold portion 15 (refer to FIG. 12).

The outer cylindrical portion 34 extends along the inner surface of the main body housing 3. The inner cylindrical portion 35 holds the stator core 41 of the brushless motor 1. Specifically, as shown in FIG. 11, the inner peripheral surface of the inner cylindrical portion 35 is engaged with the outer peripheral surface of the stator core 41 of the brushless motor 1, for example, in a concavo-convex manner. The stationary blades 36 are disposed to connect together the outer and inner cylindrical portions 34 and 35, and are arranged obliquely relative to the air passage. The stationary blade 36 includes a predetermined number of (e.g., seven) blades which are arranged at irregular angle intervals around the shaft of the fan 2. To arrange them at irregular angle intervals is to prevent noises from increasing due to resonance. Also, the number of the stationary blades 36 is set such that, in view of the above-mentioned number of the moving blades 17 of the fan 2, one of them is not an integral multiple of the other. This is also to prevent noises from increasing due to resonance.

As can be seen clearly from FIG. 11, one of the stationary blades 36 is produced by butting a first stationary blade portion 36A formed in one of the portions of the bisected motor casing 11 against a second stationary blade portion 36B formed in the other portion. And, the wiring 40 (refer to FIG. 7) of the brushless motor 1 is guided to the outside of the outer cylindrical portion 34 through a clearance 39 between the first and second stationary blade portions 36A and 36B. Through the wiring 40, the battery pack 7 and control circuit existing outside the outer cylindrical portion 34 (outside the air passage) are electrically connected to the brushless motor 1 and switching board 44 existing inside the outer cylindrical portion 34 (inside the air passage). Since the wiring 40 is guided from the inside of the air passage to the outside thereof through the clearance 39 between the first and second stationary blade portions 36A and 36B, the influence (such as the disturbance of the air current)of the wiring 40 on the air current of the air passage can be reduced or eliminated. Such wiring 40 arrangement can also reduce or eliminate a risk of the wiring 40 being cut by the air current of the air passage or by dust and the like sucked therein.

As shown in FIG. 7, inside the inner cylindrical portion 35, the switching board 44 with a predetermined number of switching elements 20 (FETs or the like) mounted thereon is fixed through an insulator 42 (an insulating member) to the stator core 41 of the brushless motor 1, for example, by screwing. In order to enhance the heat radiating property of the switching elements 20, cooling holes 38 (penetration holes) communicating with the air passage are formed in the inner cylindrical portion 35 (refer to FIGS. 8, 9 and the like). This can prevent heat generated by the switching elements 20 from staying inside the inner cylindrical portion 35 and air current arranging cone 18, whereby the heat radiating property of the switching elements 20 can be enhanced. The cooling holes 38 are formed at positions which, when viewed from the incoming side of the air passage, exist behind the stationary blade 36.

The air current arranging cone 18 extends forward continuously from the front end of the inner cylindrical portion 35. As shown in FIG. 7, the air current arranging cone 18 includes screwing holes 24 to 26 formed in its side surface. The screwing holes 24 to 26 are screwed to screwing bosses 45 to 47 (respectively having a female screw hole in their leading ends) projected from the inner surface of the air current arranging cone 18, thereby ensuring the integral connection of the right and left portions of the bisected cone 18. A spanner insertion hole 37 (slit) is also formed in the side surface of the air current arranging cone 18. In assembling, a rectangular column portion 19 (portion that is projected forward from the front bearing 12) of the front end of the output shaft 43 of the brushless motor 1 can be fixed against rotation using a tool such as a spanner or the like through the spanner insertion hole 37, whereby the fan 2 can be easily mounted onto the rear end of the output shaft 43.

The front bearing hold portion 14, as shown in FIG. 7, has a substantially U-shaped section and extends from the inner surface of the air current arranging cone 18 to hold the front bearing 12. Although not shown, another front bearing hold portion 14 extends symmetrically also from the inner surface of the air current arranging cone 18 on this side to hold the front bearing 12. The front bearing 12 supports the front end of the output shaft 43 of the brushless motor 1 rotatably. As shown in FIG. 12, the rear bearing hold portion 15 extends from the rear end of the inner cylindrical portion 35 to fix and hold the rear bearing 13. The rear bearing 13 supports the rear end of the output shaft 43 of the brushless motor 1 rotatably. The rear bearing hold portion 15 includes screwing holes 27, 28, and to screw the screwing holes 27, 28 ensures the integral connection of the right and left portions of the bisected rear bearing hold portion 15. Here, in screwing, a tool such as a driver or the like can be inserted through a predetermined number of (for example, two) driver insertion holes 21 formed in the outer cylindrical portion 34, whereby the efficiency of the screwing operation can be enhanced. The driver insertion holes 21, as shown in FIG. 5, can be filled with hole filling projections 22 provided on the inner surface of the main body housing 3 (they are fitted in such a manner that no clearance can be produced between them as much as possible). The leading end face of the hole filling projection 22 may preferably be flush with the inner peripheral surface of the outer cylindrical portion 34. Provision of the hole filling projections 22 can reduce or eliminate the ill influences of the driver insertion holes 21 on the air passage.

As shown in FIG. 2, the air guide passage member 9 includes a predetermined number of (for example, four) projections 9b on its outer peripheral surface. When the projections 9b are engaged with the same number of recesses 3c formed in the inner surface of the main body housing 3, the air guide passage member 9 can be fixed to the main body housing 3. The rear end edge of the air guide passage member 9 may preferably be contacted with the front end edge of the outer cylindrical portion 34 of the motor casing 11 with no clearance between them.

Now, description is given simply of an example of the flow of the assembling operation of the cordless portable blower according to the present exemplary embodiment.

Firstly, after the brushless motor 1 is incorporated into one of the portions of the bisected motor casing 11 in such a manner as shown in FIG. 7, the portions of the motor casing 11 are connected together into an integral body by screwing the screwing holes 24 to 26 (refer to FIG. 7) and screwing holes 27, 28 (refer to FIG. 12). In this case, the wiring 40 of the brushless motor 1 is sandwiched between the first and second stationary blade portions 36A and 36B, whereby the wiring 40 is guided from the clearance 39 between the first and second stationary blade portions 36A and 36B (refer to FIG. 11 and the like) to the outside of the outer cylindrical portion 34. Here, as described above, when screwing the screwing holes 27, 28, the driver insertion hole 21 of the outer cylindrical portion 34 can be used. Then, the fan 2 is mounted onto the rear end of the output shaft 43 of the brushless motor 1. In this case, in order to stop the rotation of the output shaft 43, a tool such as a spanner or the like is inserted from the spanner insertion hole 37 (refer to FIG. 6 and the like) to thereby lock the rectangular column portion 19 of the front end of the output shaft 43. Then, the projections 9b of the air guide passage member 9 are engaged with the recesses 3c of one of the portions of the bisected main body housing 3, the motor casing 11 is positioned in one portion of the bisected main body housing 3, and the other portion of the main body housing 3 is then put on one portion from above. In this state, by screwing the screwing holes 23, the portions of the motor casing 11 are fixed to each other and further, by screwing the remaining screwing holes, they are connected together into an integral body, the cover 8a is mounted and fixed to the air inlet 8 of the rear end of the main body housing 3, and the nozzle 10 is mounted onto the front end of the air guide passage member 9.

The exemplary embodiments can provide the following advantages.

(1) The battery mounting portion 3*b* projects convexly into the air passage and the outer surfaces of the bottom surface section 31 and side surface sections 32, 33 of the battery mounting portion 3*b* configure part of the inner surface of the air passage. Therefore, the battery pack 7 can provide excellent heat radiating property. This can prevent the battery pack 7 against overheating and thus can advantageously extend the life of the battery pack 7. Also, when the high temperature protection function of the battery pack 7 is provided, the frequent operation of the protection function can be prevented to thereby enhance the blower operation efficiency.

(2) The battery pack mounting portion 3*b* holds the battery pack 7 in such a manner that the center of gravity of the battery pack 7 exists at an attitude as close to the handle portion 3*a* as possible. Therefore, while in operation, especially when swinging the blower main body right and left, the influence of the moment of inertia of the battery pack 7 can be reduced to thereby enhance the operation performance of the blower. Also, when the weight of the battery pack 7 is caused to vary due to the varied capacity thereof, or when mounting, instead of the battery pack 7, an adapter provided on the leading end of a cable extended from an external power supply such as a back-carrying power supply (the adapter is similar in shape to the battery pack but is lighter in weight), the influence of the battery pack 7 or adapter on the blower main body can be reduced, whereby the operation performance of the blower can be enhanced in this respect as well.

(3) The battery pack 7 projects convexly into the air inlet 8. Therefore, the battery pack 7 provides a sound insulation effect (since the battery pack 7 is heavy, the battery pack 7 serves effectively as a sound insulation wall), thereby being able to enhance the tranquility of the blower.

(4) The inner cylindrical portion 35 includes the cooling hole 38 communicating with the air passage. Therefore, the switching element 20 provided inside the inner cylindrical portion 35 is enhanced in its heat radiating properties.

(5) The motor casing 11 is bisected and the wiring 40 of the brushless motor 1 is guided from inside the inner cylindrical portion 35 (from inside the air passage) to outside the outer cylindrical portion 34 (to outside the air passage) through the clearance 39 of the bisected stationary blade 36 (the clearance 39 between the first and second stationary blade portions 36A and 36B shown in FIG. 7 and the like). Therefore, the influence of the wiring 40 on the air current of the air passage (such as the disturbance of the air current) can be reduced or eliminated. This can also reduce or eliminate a risk of the wiring 40 being cut by the air current of the air passage or by dust or the like sucked therein.

(6) When screwing the screwing holes 27 and 28, a tool such as a driver can be inserted through the driver insertion holes 21 formed in the outer cylindrical portion 34, whereby the assembling operation efficiency of the blower is enhanced. On the other hand, after assembled, the hole filling projections 22 provided on the inner surface of the main body housing 3 fill the driver insertion holes 21. This can reduce or eliminate the ill influence of the driver insertion holes 21 on the air passage. Also, the hole filling projections 22 and driver insertion holes 21 are engaged with each other and thus they are positioned when assembling the blower. This can further enhance the efficiency of the blower assembling operation.

(7) The spanner insertion hole 37 is formed in the side surface of the air current arranging cone 18. Therefore, when assembling the blower, the rectangular column portion 19 of the front end of the output shaft 43 of the brushless motor 1 can be fixed against rotation by a tool such as a spanner or the like through the spanner insertion hole 37, thereby being able to enhance the efficiency of an operation to mount the fan 2 onto the rear end of the output shaft 43 using a nut or the like.

(8) The rear bearing 13 and the moving blade 17 of the fan 2 overlap with each other in their axial-direction positions. Therefore, the total of the axial-direction lengths of the brushless motor 1 and fan 2 can be reduced.

(9) The stationary blades 36 are arranged at irregular angle intervals around the fan shaft. Therefore, an increase in noise due to resonance can be prevented to thereby enhance the tranquility of the blower. The number of the stationary blades 36 and the number of the moving blades 17 of the fan 2 are set such that one will not be an integer multiple of the other, whereby an increase in noise due to resonance can be prevented and thus the tranquility of the blower can be enhanced in this respect as well.

Although the invention has been described with reference to the above exemplary embodiments, it is obvious to persons skilled in the art that the respective composing elements and the respective treating process of the exemplary embodiment can be changed variously without departing from the scope of the appended patent claims.

What is claimed is:

1. A portable blower comprising:
   a motor; and
   a motor casing configured to support the motor,
   wherein the motor casing comprises:
      an outer cylindrical portion;
      an inner cylindrical portion, wherein the motor is positioned in an inside of the inner cylindrical portion; and
      stationary blade portions which are provided so as to bridge between the outer cylindrical portion and the inner cylindrical portion, and
   wherein the motor casing is made up by integrally combining a first divided constituent member and a second divided constituent member,
   wherein the first divided constituent member comprises:
      a first outer cylindrical portion, which is a part of the outer cylindrical portion;
      a first inner cylindrical portion, which is a part of the inner cylindrical portion; and
      a first stationary blade portion connecting the first outer cylindrical portion and the first inner cylindrical portion, and
   wherein the second divided constituent member comprises:
      a second outer cylindrical portion, which is another part of the outer cylindrical portion;
      a second inner cylindrical portion, which is another part of the inner cylindrical portion; and
      a second stationary blade portion connecting the second outer cylindrical portion and the second inner cylindrical portion,
   wherein the first stationary blade portion butts the second stationary blade portion along an abutment to define a blade with a clearance located along a portion of the abutment, wherein a wiring configured to energize the motor leads from an inside of the inner cylindrical portion to an outside of the outer cylindrical portion through the clearance between the first stationary blade portion and the second stationary blade portion.

2. The portable blower according to claim 1, further comprising:

a fan configured to be rotated by the motor,
wherein the motor casing comprises a bearing hold portion configured to hold a bearing that is configured to support a rear end portion of an output shaft of the motor, and
wherein the fan comprises:
- a dome portion which covers the bearing holding portion; and
- moving blade portions which are provided on the dome portion, and wherein the moving blade portions and the bearing overlap in an axial direction of the output shaft.

3. The portable blower according to claim 2, wherein the motor casing comprises an air current arranging cone at a front side of the motor,
wherein a through hole is provided in a side surface of the air current arranging cone, the through hole being configured to allow a tool to pass therethrough to lock a front end portion of the output shaft when attaching the fan to the rear end portion of the output shaft of the motor.

4. A portable blower comprising:
a motor; and
a motor casing configured to support the motor,
wherein the motor casing comprises:
- an outer cylindrical portion; and
- an inner portion, and wherein the inner portion comprises:
- an inner cylindrical portion, wherein the motor is positioned in an inside of the inner cylindrical portion; and
- stationary blade portions which are provided so as to bridge between the outer cylindrical portion and the inner cylindrical portion, and wherein the inner portion is made up by integrally combining a first inner divided constituent member and a second inner divided constituent member,
wherein the first inner divided constituent member comprises:
- a first inner cylindrical portion, which is a part of the inner cylindrical portion; and
- a first stationary blade portion connecting the first outer cylindrical portion and the first inner cylindrical portion, and wherein the second inner divided constituent member comprises:
- a second inner cylindrical portion, which is another part of the inner cylindrical portion; and
- a second stationary blade portion connecting the second outer cylindrical portion and the second inner cylindrical portion, wherein the first stationary blade portion butts the second stationary blade portion along an abutment to define a blade with a clearance located along a portion of the abutment, wherein a wiring configured to energize the motor leads from an inside of the inner cylindrical portion to an outside of the outer cylindrical portion through the clearance between the first stationary blade portion and the second stationary blade portion.

5. A portable blower comprising:
a motor; and
a motor casing configured to support the motor,
wherein the motor casing comprises:
- an outer portion, and
- an inner cylindrical portion, wherein the motor is positioned in an inside of the inner cylindrical portion; and wherein the outer portion comprises:
- an outer cylindrical portion;
- stationary blade portions which are provided so as to bridge between the outer cylindrical portion and the inner cylindrical portion, and wherein the outer portion is made up by integrally combining a first outer divided constituent member and a second outer divided constituent member,
wherein the first outer divided constituent member comprises:
- a first outer cylindrical portion, which is a part of the outer cylindrical portion; and
- a first stationary blade portion connecting the first outer cylindrical portion and the first inner cylindrical portion, and wherein the second outer divided constituent member comprises:
- a second outer cylindrical portion, which is another part of the outer cylindrical portion; and
- a second stationary blade portion connecting the second outer cylindrical portion and the second inner cylindrical portion, wherein the first stationary blade portion butts the second stationary blade portion along an abutment to define a blade with a clearance located along a portion of the abutment, wherein a wiring configured to energize the motor leads from an inside of the inner cylindrical portion to an outside of the outer cylindrical portion through the clearance between the first stationary blade portion and the second stationary blade portion.

* * * * *